(12) United States Patent
Peuhkurinen et al.

(10) Patent No.: US 12,406,432 B2
(45) Date of Patent: Sep. 2, 2025

(54) MIXED-REALITY OCCLUSION USING 3D RECONSTRUCTION

(71) Applicant: Varjo Technologies Oy, Helsinki (FI)

(72) Inventors: Ari Antti Peuhkurinen, Helsinki (FI); Mikko Strandborg, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 243 days.

(21) Appl. No.: 18/319,953

(22) Filed: May 18, 2023

(65) Prior Publication Data
US 2024/0386655 A1  Nov. 21, 2024

(51) Int. Cl.
*G06T 15/40* (2011.01)
*G06F 3/01* (2006.01)
*G06T 7/50* (2017.01)
*G06T 19/00* (2011.01)

(52) U.S. Cl.
CPC .............. *G06T 15/40* (2013.01); *G06F 3/013* (2013.01); *G06T 7/50* (2017.01); *G06T 19/006* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2012/0206452 A1* | 8/2012 | Geisner | G06F 3/013 |
| | | | 345/419 |
| 2013/0215230 A1* | 8/2013 | Miesnieks | H04N 13/20 |
| | | | 348/46 |
| 2013/0326364 A1* | 12/2013 | Latta | G06F 3/012 |
| | | | 715/751 |
| 2016/0026242 A1* | 1/2016 | Burns | G06F 3/04817 |
| | | | 345/633 |
| 2021/0295602 A1* | 9/2021 | Scapel | G06F 3/04815 |

(Continued)

FOREIGN PATENT DOCUMENTS

DE  102021131157 A1 *  6/2023  ........... G01C 21/365

OTHER PUBLICATIONS

Author: Walton et al.; Title: Accurate Real-time Occlusion for Mixed Reality; Date: Nov. 2007; Publisher: ACM; Source: https://discovery.ucl.ac.uk/id/eprint/1575582/7/Walton_a11-walton.pdf (Year: 2017).*

*Primary Examiner* — Jwalant Amin
(74) *Attorney, Agent, or Firm* — Ziegler IP Law Group, LLC

(57) ABSTRACT

Disclosed is a system with server(s) communicably coupled to client device(s). The server(s) is configured to obtain a 3D model of a real-world environment; receive, from client device(s), viewpoint information indicative of a viewpoint from a perspective of which a mixed-reality (MR) image is to be generated; for virtual object(s) to be embedded in MR image, determine portion(s) of the virtual object(s) being occluded by real object(s) present in the real-world environment, based on optical depths determined from 3D model corresponding to a viewpoint, a position at which the virtual object(s) is to be embedded with respect to viewpoint, and at least one of: size of the virtual object(s), shape of the virtual object(s), orientation of the virtual object(s) with respect to viewpoint; and send a remaining portion of the virtual object(s) that is not being occluded to client device(s).

12 Claims, 5 Drawing Sheets

(56) References Cited

U.S. PATENT DOCUMENTS

2022/0139048 A1* 5/2022 Macdermot ............. H04S 7/305
                                                            345/419
2022/0206298 A1* 6/2022 Goodman ............... G06F 3/011
2024/0029363 A1* 1/2024 Banerjee ................. G06T 15/00

* cited by examiner

MIXED-REALITY OCCLUSION USING 3D RECONSTRUCTION

TECHNICAL FIELD

The present disclosure relates to systems incorporating mixed-reality occlusion using three-dimensional (3D) reconstruction. The present disclosure also relates to methods incorporating mixed-reality occlusion using 3D reconstruction.

BACKGROUND

Nowadays, with increase in number of images being captured every day, there is an increased demand for image processing. Such a demand may, for example, be quite high and critical in case of evolving technologies such as immersive mixed-reality (MR) technologies, which are being employed in various fields such as entertainment, real estate, training, medical imaging operations, simulators, navigation, and the like. Such immersive MR technologies create MR environments for presentation to users of MR devices (such as MR headsets, pairs of MR glasses, or similar). Typically, a user wears an MR device on his/her head to experience an MR environment. In such an MR environment, at least some of real-world objects are to be presented to the user along with virtual objects.

Existing technologies for generating MR images constituting the MR environments including both real-world objects and virtual objects have several limitations. These technologies are limited in their ability to accurately perform occlusion between the real-world objects and the virtual objects of the MR environments. This is because the existing technologies rely on depth sensors (for example, such as light detection and ranging (LIDAR) sensors, time-of-flight (ToF) sensors, stereoscopic depth sensors, or the like) of the MR devices of the users to detect optical depths of surfaces of the real-world objects for performing the occlusion. Such a manner for performing the occlusion is highly dependent/limiting on a distance of a given real-world object from a depth sensor, and on a resolution provided by the depth sensor. Resultantly, the occlusion is not accurately applied for all the real-world objects. This undesirably compromises realism and immersiveness of the user within the MR environment, as the real objects and the virtual objects are improperly occluded, and MR images appear unnatural to the user. Moreover, the aforesaid occlusion is entirely performed by an MR device for generating the MR images, which is highly computationally-intensive and time-consuming.

Therefore, in light of the foregoing discussion, there exists a need to overcome the aforementioned drawbacks.

SUMMARY

The present disclosure seeks to provide a system and a method incorporating mixed-reality occlusion using 3D reconstruction. The aim of the present disclosure is achieved by a system and a method which incorporate a three-dimensional (3D) model of a given real-world environment, at a server side, to achieve mixed-reality (MR) occlusion, as defined in the appended independent claims to which reference is made to. Advantageous features are set out in the appended dependent claims.

Embodiments of the present disclosure substantially eliminate or at least partially address the aforementioned problems in the prior art, and facilitate in providing accurate and reliable MR occlusion in MR images by way of using 3D reconstruction at a server side, thereby enabling generation of highly accurate and realistic MR images, whilst reducing processing burden of client device(s).

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 4C illustrates a remaining portion of the at least one virtual object that is not being occluded, while

DETAILED DESCRIPTION OF EMBODIMENTS

Figure 1A:
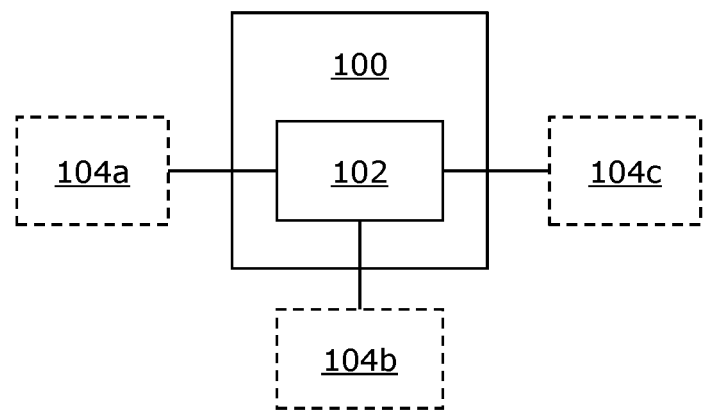
FIGS. 1A and 1B illustrate block diagrams of architectures of a system incorporating mixed-reality (MR) occlusion using three-dimensional (3D) reconstruction, in accordance with different embodiments of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising at least one server that is communicably coupled to at least one client device, wherein the at least one server is configured to:

obtain a three-dimensional (3D) model of a given real-world environment;

receive, from the at least one client device, viewpoint information indicative of a given viewpoint from a perspective of which a given mixed-reality (MR) image is to be generated;

for at least one virtual object that is to be embedded in the given MR image, determine at least one portion of the at least one virtual object that is being occluded by at least one real object present in the given real-world environment, based on optical depths determined from the 3D model corresponding to the given viewpoint, a given position at which the at least one virtual object is to be embedded with respect to the given viewpoint, and at least one of: a size of the at least one virtual object, a shape of the at least one virtual object, a given orientation of the at least one virtual object with respect to the given viewpoint; and send a remaining portion of the at least one virtual object that is not being occluded to the at least one client device.

In a second aspect, an embodiment of the present disclosure provides a method comprising:

obtaining, by at least one server, a three-dimensional (3D) model of a given real-world environment;

receiving, at the at least one server from at least one client device, viewpoint information indicative of a given viewpoint from a perspective of which a given mixed-reality (MR) image is to be generated;

for at least one virtual object that is to be embedded in the given MR image, determining, at the at least one server, at least one portion of the at least one virtual object that is being occluded by at least one real object present in the given real-world environment, based on optical depths determined from the 3D model corresponding to the given viewpoint, a given position at which the at least one virtual object is to be embedded with respect to the given viewpoint, and at least one of: a size of the at least one virtual object, a shape of the at least one virtual object, a given orientation of the at least one virtual object with respect to the given viewpoint; and sending a remaining portion of the at least one virtual object that is not being occluded from the at least one server to the at least one client device.

The present disclosure provides the aforementioned system and the aforementioned method for facilitating in providing accurate and reliable mixed-reality (MR) occlusion in MR images by way of using 3D reconstruction at the server side, thereby enabling generation of highly accurate and realistic MR images, whilst reducing processing burden of the client device(s). Herein, at least one portion of the at least one virtual object that is being (definitely) occluded by the at least one real object is accurately determined by the at least one server. Then, only the remaining portion (that is non-occluded/visible) is sent to the at least one client device for digitally embedding the remaining portion in a given input image, to generate the given MR image. As a result, the at least one portion of the at least one virtual object appears to be well-occluded in the given MR image, and only the remaining portion of the at least one virtual object is visible in the given MR image. Advantageously, this facilitates in providing a highly realistic and immersive viewing experience to a user when the given MR image is shown to the user. Such a manner of generating the given MR image is computationally-efficient and time-efficient, as compared to when the at least one client itself has to identify the at least one portion of the at least one virtual object that is occluded as well as generate the given MR image thereafter. In this way, overburdening, delays, and excessive power consumption do not occur at the at least one client device's side. Moreover, since the 3D model is utilised, the occlusion of the at least one virtual object with respect to even real objects which are very far away is determined accurately (i.e., without relying on depth cameras of the at least one client device). The method and the system are simple, robust, support real-time high-quality and reliable MR occlusions, and can be implemented with ease.

Notably, the at least one server controls an overall operation of the system. In some implementations, the at least one server is implemented as a remote server. In an example, the remote server could be a cloud server that provides a cloud computing service, and could be arranged in a different geographical location than the given real-world environment. In other implementations, the at least one server is implemented as a processor of a computing device that is communicably coupled to the at least one client device. Examples of the computing device include, but are not limited to, a laptop, a desktop, a tablet, a phablet, a personal digital assistant, a workstation, and a console.

The given MR image could be generated by the at least one client device, upon receiving the remaining portion of the at least one virtual object from the at least one server, as discussed later in detail. The at least one client device could be implemented as a display device, or as another device serving the display device. Examples of the display device include, but are not limited to, a head-mounted display (HMD) device, and a smartphone. As an example, a smartphone can be inserted into a viewer made from cardboard, to display MR images to the user. The term "head-mounted display" device refers to a specialized equipment that is configured to present an MR environment to a user when said HMD device, in operation, is worn by the user on his/her head. The HMD device is implemented, for example, as an MR headset, a pair of MR glasses, or the like, that is operable to display a scene of the MR environment to the user.

It will be appreciated that the term "at least one server" refers to "a single server" in some implementations, and to "a plurality of servers" in other implementations. When the system comprises the single server, all operations of the system can be performed by the single server. When the system comprises the plurality of servers, different operations of the system can be performed by different (and specially configured) servers from amongst the plurality of servers. As an example, a first server from amongst the plurality of servers may be configured to obtain the 3D model of the given real-world environment and receive the viewpoint information from the at least one client device, and a second server from amongst the plurality of servers may be configured to determine the at least one portion of the at least one virtual object that is being occluded by the at least one real object present in the given real-world environment, and send the remaining portion of the at least one virtual object to the at least one client device.

Throughout the present disclosure, the term "three-dimensional model" of the given real-world environment refers to a data structure that comprises comprehensive information pertaining to real objects or their parts present in the given real-world environment. Such comprehensive information is indicative of at least one of: surfaces of the real objects or their parts, a plurality of features of the real objects or their parts, shapes and sizes of the real objects or their parts, poses of the real objects or their parts, materials of the real objects or their parts, colour information of the real objects or their parts, depth information of the real objects or their parts, light sources and lighting conditions within the given real-world environment. The term "real object" refers to a physical object or a part of the physical object present in the given real-world environment. A real object could be a living object (for example, such as a human, a pet, a plant, and the like) or a non-living object (for example, such as a wall, a building, a shop, a road, a window, a toy, a poster, a lamp, and the like). Examples of the plurality of features include, but are not limited to, edges, corners, blobs, a high-frequency feature, a low-frequency feature, and ridges.

Optionally, the 3D model of the given real-world environment is in a form of at least one of: a 3D polygonal mesh, a 3D point cloud, a 3D surface cloud, a 3D surflet cloud, a voxel-based model, a parametric model, a 3D grid, a 3D hierarchical grid, a bounding volume hierarchy, an image-based 3D model. The 3D polygonal mesh could be a 3D triangular mesh or a 3D quadrilateral mesh. The aforesaid forms of the 3D model are well-known in the art.

In an embodiment, the at least one server is configured to obtain the 3D model of the given real-world environment from at least one data repository that is communicably coupled to the at least one server. In such a case, the 3D model of the real-world environment is pre-generated (for example, by the at least one server), and pre-stored at the at least one data repository. It will be appreciated that the at least one data repository could, for example, be implemented as a memory of the at least one server, a memory of the at least one client device, a memory of the computing device, a removable memory, a cloud-based database, or similar. Optionally, the system further comprises the at least one data repository.

In another embodiment, when obtaining the 3D model of the given real-world environment, the at least one server is configured to generate the 3D model from a plurality of visible-light images and a plurality of depth images (corresponding to the plurality of visible-light images) of the given real-world environment, based on corresponding viewpoints from perspectives of which the plurality of visible-light images and the plurality of depth images are captured. Optionally, in this regard, the at least one server is configured to employ at least one data processing algorithm for processing the plurality of visible-light images and the plurality of depth images to generate the 3D model. Optionally, the at least one data processing algorithm is at least one of: a feature extraction algorithm, an image stitching algorithm, an image merging algorithm, an interpolation algorithm, a 3D modelling algorithm, a photogrammetry algorithm, an image blending algorithm. Such data processing algorithms are well-known in the art. It will be appreciated that the plurality of visible-light images, the plurality of depth images, and information pertaining to the corresponding viewpoints could be received by the at least one server from any of:

a device comprising pose-tracking means and at least one camera implemented as a combination of a visible-light camera and a depth camera, or at least one data repository in which the plurality of colour images, the plurality of depth maps, and said information are pre-stored.

Optionally, the 3D model is generated in a given coordinate space. Herein, the term "coordinate space" refers to a 3D space of the given real-world environment that is represented by a given coordinate system. As an example, the given coordinate system may be a Cartesian coordinate system. Optionally, the given coordinate system has a pre-defined origin and three mutually perpendicular coordinate axes. The three mutually perpendicular coordinate axes could be, for example, X, Y, and Z axes. Optionally, in this regard, a 3D position of the given viewpoint in the given coordinate system is expressed as (x, y, z) position coordinates along the X, Y and Z axes, respectively. Likewise, an orientation of the given viewpoint in the given coordinate system could be expressed, for example, using rotation quaternions, Euler angles, rotation matrices, or the like.

Throughout the present disclosure, the term "viewpoint" encompasses both a viewing position and a viewing direction in the given real-world environment from perspective of which the given MR image is to be generated. Optionally, the given viewpoint is a viewpoint of at least one camera of the at least one client device. It will be appreciated that multiple real objects or their parts present in the given real-world environment span across a field of view of the at least one camera; therefore, for a given input image that is captured from the given viewpoint (and that is subsequently used for generating the given MR image), light reflecting off these multiple objects or their parts is incident upon a sensor chip of the at least one camera at different incident angles. As an example, when an angular width of a horizontal field of view of the at least one camera is 90 degrees, said real objects or their parts are captured in the given input image such that information pertaining to the multiple real objects or their parts is captured from −45 degrees to +45 degrees from a centre of the horizontal field of view. Thus, the given viewpoint from which a given real object or its part is captured by the at least one camera not only depends on a viewing position and a viewing direction of the at least one camera, but also depends on which portion of the field of view of the at least one camera is the given object or its part captured.

The term "input image" refers to an image representing a scene of the given real-world environment from a perspective of the given viewpoint. Optionally, the given input image is a video-see-through (VST) image that is captured by the at least one camera of the at least one client device. It will be appreciated that the given input image is digitally modified when the at least one virtual object is overlaid thereupon, for generating the given MR image. The given input image represents a view of the given real-world environment from a perspective of the user of the at least one client device, and represents real objects that lie in a field of view of the user.

Optionally, the at least one client device comprises tracking means for tracking viewpoints of the at least one camera. It will be appreciated that the tracking means could be implemented as at least one of: an optics-based tracking system (which utilizes, for example, infrared beacons and detectors, IR cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible-light camera, an RFID reader. The tracking means may employ an outside-in tracking technique, an inside-out tracking technique, or a combination of both the aforesaid techniques, for collecting tracking data. The tracking data may be in form of images, IMU/TIMU values, motion sensor data values, magnetic field strength values, or similar. Optionally, the tracking means is implemented as a true six Degrees of Freedom (6DoF) tracking system. Optionally, the processor of the at least one client device is configured to process said tracking data using at least one data processing algorithm, for determining the viewpoints of the at least one camera. Examples of the at least one data processing algorithm include a feature detection algorithm, an environment mapping algorithm, a data extrapolation algorithm, and the like. The aforesaid tracking means are well-known in art.

It will be appreciated that the tracking data may be collected and processed dynamically, i.e., continuously, periodically (for example, after every 10 milliseconds), or intermittently (for example, after 10 milliseconds, and then again after 50 milliseconds, and so on). For example, a rate of collecting and processing the tracking data may be high, when the user is moving. In such a case, the tracking data may be collected and processed, for example, at every millisecond.

Herein, the term "camera" refers to an equipment that is operable to detect and process light signals received from the given real-world environment, so as to capture image(s) of the given real-world environment. Herein, such images are referred to as input images (for example, in form of colour images and/or depth images). Optionally, the at least one camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Alternatively, optionally, the at least one camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera.

It will be appreciated that the given viewpoint could also be determined (by the processor of the at least one client device), based on a given pose of a head of the user or of the display device (depending on whether or not the display device is worn on the user's head). In this regard, the tracking means is employed to detect and/or follow a pose of the head of the user or of the display device within the given real-world environment. The term "pose" encompasses a position and/or an orientation. In practice, the tracking means is actually employed to track a pose of the display device; the pose of the head of the user corresponds to the pose of the display device, when the display device is worn by the user on his/her head. Optionally, the processor of the at least one client device employs the at least one data processing algorithm to process the tracking data, to determine the given viewpoint corresponding to the pose of the head of the user or of the display device.

Notably, when the at least one virtual object is to be embedded (namely, overlaid or superimposed) in the given MR image at the given position, portion(s) of the at least one virtual object could be occluded (i.e., visually obscured or hidden) by the at least one real object or its part present in the given real-world environment. This particularly occurs when the at least one virtual object having at least one of: a given size, a given shape, a given orientation, is to be embedded at the given position that lies behind the at least one real object or its part when viewed from the given viewpoint. By knowing the optical depths from the 3D model, the at least one server accurately knows how real objects are located in the given real-world environment with respect to each other from a perspective of the given viewpoint, as said optical depths provide information pertaining to placements, geometries, occlusions, and the like, of the real objects or their parts from the perspective of the given viewpoint. Thus, once the given position at which the at least one virtual object is to be embedded and at least one of: the given size, the given shape, the given orientation, of the at least one virtual object are known, the at least one server can easily and accurately identify which portion(s) of the at least one virtual object are highly likely to be occluded by the at least one real object (or its part). It will be appreciated that since the real objects represented in the 3D model are generally static objects present in the given real-world environment, and the at least one server performs a preliminary occlusion determination using said 3D model, the at least one (determined) portion of the at least one virtual object would be highly accurate, i.e., said portion would certainly be occluded by the at least one real object.

Optionally, when determining the optical depths from the 3D model, the at least one server is configured to use the 3D model to generate at least one reconstructed depth map from the perspective of the given viewpoint. The at least one reconstructed depth map represents the optical depths of the real objects or their parts present in the given real-world environment from the perspective of the given viewpoint (for example, in the given coordinate space), said optical depths being determined using the 3D model. Optionally, the at least one reconstructed depth map is in a form of a reconstructed depth image. Techniques/algorithms (for example, such as an image synthesis algorithm, a view synthesis algorithm, a rendering algorithm, and the like) for generating reconstructed depth maps using the 3D model are well-known in the art.

Alternatively, optionally, when determining the optical depths from the 3D model, the at least one server is configured to employ a ray casting technique or a cone tracing technique for determining the optical depths of the real objects or their parts, wherein a virtual camera is arranged according to the given viewpoint in the 3D model, and rays of light or cones of light are cast out from the virtual camera in different directions in the given real-world environment. The ray casting technique and the cone tracing technique are well-known in the art.

It will be appreciated that since the at least one server generates the at least one virtual object, the size of the at least one virtual object, the shape of the at least one virtual object, and the given orientation of the at least one virtual object would be already accurately known to the at least one server.

Throughout the present disclosure, the term "virtual object" refers to a computer-generated object (namely, a digital object). Examples of the at least one virtual object may include, but are not limited to, a virtual navigation tool (such as a virtual map, a virtual direction signage, and so forth), a virtual gadget (such as a virtual calculator, a virtual computer, and so forth), a virtual message (such as a virtual instant message, a virtual to-do note, and so forth), a virtual entity (such as a virtual person, a virtual mascot, a virtual animal, a virtual ghost, and so forth), a virtual logo of a company, a virtual entertainment media (such as a virtual painting, a virtual video, a virtual advertisement, and so forth), a virtual vehicle or part thereof (such as a virtual car, a virtual cockpit, and so forth), and a virtual information (such as a virtual notification, a virtual news description, a virtual announcement, virtual data, and so forth).

Optionally, the at least one server is configured to execute at least one software application to generate the at least one virtual object. Herein, the term "software application" refers to an MR experience application which, when executed, generates the at least one virtual object to be embedded on a given input image representing the given real-world environment to generate a given MR image. As an example, the at least one software application could pertain to at least one of: an MR advertisement, an MR infotainment, a MR navigation, an MR entertainment, an MR notification, an MR information, MR healthcare, MR tourism, MR education.

In an embodiment, the at least one server is configured to generate the at least one virtual object that is to be embedded, based on at least one of: an empty space that is not occupied by any real object in the given real-world environment, information to be presented to a user via the at least one virtual object. In this regard, the at least one virtual object is generated by taking into account (information pertaining to) the (available) empty space in the given real-world environment, i.e., a space that is unoccupied by the real objects. This ensures that placement of the at least one virtual object does not interfere or overlap with the real objects, and thus upon embedding the at least one virtual object in the given MR image, the at least one virtual object appears to be well-blended (i.e., naturally-placed) along with the (existing) real objects. Advantageously, this facilitates in providing a highly realistic and immersive viewing experience to a user when the given MR image is shown to the user. It will be appreciated that the information pertaining to the empty space and an occupied space in the given real-world environment could be acceptably accurately known from the comprehensive information in the 3D model.

Furthermore, alternatively or additionally, the at least one virtual object could be generated based on the (virtual) information that is to be presented to the user, depending on the at least one software application being executed by the at least one server. In an example, when an MR navigation application is executed by the at least one server, a given virtual object may be virtual arrows on a path that directs the user towards his/her destination. Optionally, the at least one virtual object is generated based on a location of the user in the given real-world environment. As an example, when the user is located at or in a vicinity of a restaurant, a given virtual object may be a virtual menu of the restaurant. As another example, when the user is located at an apparel shop, a given virtual object may be a virtual mascot of an advertisement of on-going offers at the apparel shop. As yet another example, when the user is located at a theatre, a given virtual object may be a virtual notification of upcoming movie(s) or show(s) in the theatre. As still another example, when the user may be present inside a shopping mall comprising multiple floors. In such a case, a software application (and its associated virtual objects) for one floor of the shopping mall may be different from another software application (and its associated virtual objects) for another floor of the (same) shopping mall, even when a geographical location of the user is same.

In an embodiment, the at least one server is configured to determine the given position at which the at least one virtual object is to be embedded with respect to the given viewpoint, based on at least one of: an empty space that is not occupied by any real object in the given real-world environment, a gaze region in the given real-world environment. In this regard, when determining the given position, the at least one server takes into account physical constraints of the given real-world environment, including presence of real objects and the (available) empty space in the given real-world environment. This can be acceptably accurately known from the comprehensive information in the 3D model. Optionally, the given position at which the at least one virtual object is to be embedded corresponds to (a position, for example, in form of coordinates of) the empty space in the given real-world environment. For example, a given software application, upon its execution, may generate a virtual coffee mug on a table present in the given real-world environment, wherein a position of the virtual coffee mug correspond to an empty space upon the table. Thus, beneficially, positioning the at least one virtual object according to the empty space facilitates in blending the at least one virtual object seamlessly with the real objects without any interference or overlapping with the real objects, thereby creating a highly realistic MR experience for the user.

Furthermore, alternatively or additionally, the given position at which the at least one virtual object is to be embedded corresponds to the gaze region in the given real-world environment. This is because the gaze region is a gaze-contingent area in (a scene of) the given real-world environment whereat user's gaze is directed (namely, focused), and thus positioning the at least one virtual object according to the gaze region facilitates in providing a realistic and immersive viewing experience as the at least one virtual object would be perceived by the user with high visual acuity and the user would direct his/her gaze towards the at least one virtual object (which is visually alluring and is likely to attract the user's attention). In an example, when the gaze region lies at a centre of a scene of the given real-world environment, a position of a given virtual object may be towards a central portion of the given MR image. Similarly, the gaze region may also lie towards a left side, a right side, a top side, a bottom side, or a corner side, of the scene of the given real-world environment, and thus the position of the given virtual object may be determined accordingly. It is to be understood that positioning the at least one virtual object in a non-gaze-contingent area may not enhance an overall viewing experience of the user, as the user would not be directly looking at the at least one virtual object, and may also require additional unnecessary processing resources and processing time.

Optionally, when determining the gaze region in the given real-world environment, the at least one server is configured to: receive, from the at least one client device, information indicative of a gaze direction of the user; and determine the gaze region, based on the gaze direction of the user. Optionally, in this regard, the at least one client device comprises gaze-tracking means. The term "gaze-tracking means" refers to a specialized equipment for detecting and/or following a gaze of the user. The term "gaze direction" refers to a direction in which the user is gazing. The gaze direction may be indicated by a gaze vector. The gaze-tracking means could be implemented as contact lenses with sensors, cameras monitoring a position, a size and/or a shape of a pupil of the user's eyes, and the like. Such gaze-tracking means are well-known in the art. It will be appreciated that the information indicative of the gaze direction of the user is received repeatedly, as user's gaze keeps changing. The gaze region may depend on an accuracy of the gaze-tracking means as well as a size of a natural human gaze region for an optical depth at which the user is gazing. It will be appreciated that when the user's gaze is directed (namely, focused) towards a point or a region within the scene of the given real-world environment, a gaze direction of a first eye and a gaze direction of a second eye of the user are different from each other, and both the aforesaid gaze directions will converge at said point or at said region. Since the gaze direction of the user in the scene of the given real-world environment is known, the gaze region could be easily and accurately determined in the scene of the given real-world environment by mapping the gaze direction to the scene, based on the given viewpoint.

In an embodiment, the at least one server is configured to determine the given orientation of the at least one virtual object with respect to the given viewpoint, based on at least one of: a distance of the given viewpoint from at least one plane of the given real-world environment, relative positions of real objects present in the given real-world environment with respect to each other. Optionally, in this regard, the given orientation of the at least one virtual object depends on the distance of the given viewpoint from the at least one plane, from which the at least one virtual object would likely be viewed by the user. This is because the at least one virtual object would have different orientations when it would be viewed from different distances from the at least one plane. The term "plane" refers to any two-dimensional (2D) planar surface present in the given real-world environment. In simple terms, the at least one plane is a flat surface. Optionally, the at least one plane is any of: a floor, a ground, a wall, a ceiling, a table top, present in the given real-world environment. In an example, when the given viewpoint is at a greater height (namely, greater distance) from the floor (for example, in a scenario when the user is standing on the floor) and when the given viewpoint is at a shorter height from the floor (for example, in a scenario when the user is sitting on the floor), a given virtual object such as a virtual coffee mug lying on a table top may appear from different orientations. Thus, the technical benefit of determining the given orientation according to the distance of the given viewpoint from the at least one plane facilitates in correctly positioning and aligning the at least one virtual object in the given MR image.

Optionally, the at least one server is configured to determine the at least one plane of the given real-world environment by:
- obtaining at least two images of the given real-world environment whose fields of view overlap at least partially;
- obtain viewpoint information indicative of corresponding viewpoints from which the at least two images are captured;
- detect, in the at least two images, at least one real object that is in contact with a given plane present in the given real-world environment;
- identify, in the at least two images, same features of the at least one real object that lie on the given plane;
- determine poses of the same features, wherein a pose of a given same feature is determined, based on a disparity in 2D positions of the given same feature in the at least two images and the corresponding viewpoints from which the at least two images are captured; and
- estimate the given plane based on the poses of the same features.

In this regard, when detecting the at least one real object that is in contact with the given plane, the at least one server is configured to employ at least one object detection algorithm. Object detection algorithms are well-known in the art. Moreover, the at least one server is configured to employ at least one feature recognition algorithm to identify the same features of the at least one object that lie on the given plane, from the at least two images. Feature recognition algorithms are also well-known in the art. Optionally, the poses of the same features are determined using a triangulation technique. The triangulation technique is well-known in the art. Furthermore, once the poses of the same features are determined, specifications of the poses are used in one or more mathematical equations for estimating the given plane, depending on a type of the same features that are identified. The given plane can be naturally described in a point-normal form using: a vector and a point lying in the given plane, two vectors lying in the given plane, three or more points lying in the given plane, or similar. It will be appreciated that once the given plane is determined, the distance of the given viewpoint from the given plane can be easily and accurately determined, for example, using at least coordinate geometry-based technique.

Alternatively or additionally, optionally, the given orientation of the at least one virtual object also depends on the relative positions of the real objects with respect to each other. This means that depending on how a real object is positioned in relation to another real object in the given real-world environment (for example, whether these real objects are near or far from each other, or whether these real objects are above, below, or adjacent to each other, and the like), the given orientation (i.e., an alignment) of the at least one virtual object is ascertained accordingly. This facilitates in embedding the at least one virtual object in the given MR image in a realistic and natural manner.

It will be appreciated that both the distance of the given viewpoint from the at least one plane and the relative positions of the real objects together enable the at least one server to determine a correct orientation of the at least one virtual object. Beneficially, this provides a desirable visual effect of proper, realistic positioning of the at least one virtual object in the MR environment. In an example, for an MR navigation application, by taking into account the height (namely, distance) of the given viewpoint from a floor of a road, and relative positions of the floor and buildings, orientations of virtual navigation marks (such as virtual arrows) can be determined accordingly.

Pursuant to embodiments, since the at least one (determined) portion of the at least one virtual object would be occluded in the given MR image, the at least one (determined) portion need not be sent to the at least one client device, and thus only the remaining portion (namely, a non-occluded portion or a visible portion) of the at least one virtual object is sent to the at least one client device. Optionally, upon receiving the remaining portion of the at least one virtual object, the at least one client device is configured to digitally embed the remaining portion of the at least one virtual object in the given input image, to generate the given MR image. As a result, the at least one portion of the at least one virtual object appears to be well-occluded in the given MR image, and only the remaining portion of the at least one virtual object is visible in the given MR image.

It will be appreciated that identifying and sending the remaining portion of the at least one virtual object (by the at least one server) enables the at least one client device to generate the given MR image in a highly computationally-efficient and time-efficient manner, as compared to when the at least one client device itself has to identify the at least one portion of the at least one virtual object that is occluded as well as generate the given MR image thereafter. In this way, overburdening, delays, and excessive power consumption do not occur at the at least one client device's side. The remaining portion of the at least one virtual object is sent to the at least one client device, in real time or near-real time.

It will also be appreciated that the remaining portion of the at least one virtual object comprises colour data, and additionally, optionally, comprises at least one of: alpha data, depth data, velocity data. The colour data may, for example, be RGB data, RGB-D data, RGB-A data, Cyan-Magenta-Yellow-Black (CMYK) data, Luminance and two-colour differences (YUV) data, or the like. The alpha data includes alpha values for each pixel of the remaining portion. As an example, in a range of 0 to 255, an alpha value of 0 could indicate fully transparent, and an alpha value of 255 could indicate fully opaque. The depth data includes depth values for each pixel of the remaining portion. The velocity data includes velocity vectors for each pixel or each group of pixels of the remaining portion. The colour data, the alpha data, the depth data, and the velocity data are well-known in the art.

Optionally, (the processor of) the at least one client device is configured to apply at least one image processing algorithm to the given input image prior to embedding/superimposing the remaining portion of the at least one virtual object over the given input image. As a result, the at least one virtual object accurately represents virtual properties of an MR environment. These virtual properties include, for example, virtual lighting, virtual object occlusion, virtual textures, virtual shadows, and the like. Optionally, the at least one image processing algorithm is at least one of: a computer-generated imagery algorithm, an image sharpening algorithm, an image smoothing algorithm, an image blurring algorithm, an image colour-change algorithm, an image merging algorithm, an image layering algorithm, an image blending algorithm, an image special-effects algorithm.

Optionally, upon generating the given MR image, the processor of the at least one client device is configured to display the given MR image via at least one light source. The term "light source" refers to an element from which light emanates. Optionally, the at least one light source is implemented as a display or a projector. Displays and projectors are well-known in the art. Optionally, the at least one light source is a single-resolution light source or a multi-resolution light source.

Furthermore, optionally, the at least one server is configured to:
 receive, from the at least one client device, a depth image captured from a perspective of the given viewpoint;
 identify at least one additional portion of the at least one virtual object that is likely to be occluded, based on a comparison between the optical depths determined from the 3D model and optical depths in the received depth image;
 determine optical depths of pixels that represent the at least one additional portion of the at least one virtual object, based on the given position at which the at least one virtual object is to be embedded with respect to the given viewpoint, and at least one of: the size of the at least one virtual object, the shape of the at least one virtual object, the given orientation of the at least one virtual object with respect to the given viewpoint; and
 send, to the at least one client device, meta information indicative of: the at least one additional portion of the at least one virtual object that is likely to be occluded and the optical depths of the pixels that represent the at least one additional portion of the at least one virtual object.

The term "depth image" refers to an image comprising information pertaining to optical depths of the real object or their parts present in the given real-world environment. In other words, a given depth image provides information pertaining to distances (namely, the optical depths) of surfaces of the objects or their parts from the perspective of the given viewpoint. In an example, the given depth image could be an image comprising a plurality of pixels, wherein a pixel value of each pixel in said image indicates an optical depth of its corresponding point/region within the given real-world environment. The term "given depth image" encompasses at least the received depth image.

Optionally, the given depth image is captured by a depth camera of the at least one client device. In some implementations, the depth camera could be integrated into the at least one camera. In some implementations, the depth camera could be separate from the at least one camera. Examples of the depth camera have already been discussed earlier. It will be appreciated that the given depth image could also be generated using at least one of: depth from focus, depth from reflectance, depth from shading, when the at least one camera has at least one of: a coded aperture, a sensor chip having phase detection autofocus (PDAF) pixels, a sensor chip in which some of its pixels are IR pixels. Such IR pixels can detect, for example, a structured light at an active-IR illumination. Moreover, the given depth image could also be generated even without using the depth camera. In this regard, the given depth image could be generated by using at least one of: a neural network model, a monocular depth estimation technique, a Structure from Motion (SfM) technique, a binocular disparity in a stereo pair of images.

Since there is likelihood of a change that may occur in the given real-world environment in a time period between generating the 3D model and receiving the depth image from the at least one client device, the comprehensive information in the 3D model may now have outdated depth information of the real objects or their part. Moreover, due to said change, it may be possible that the at least one additional portion of the at least one virtual object is likely to be occluded by some real object, apart from the at least one (determined) portion of the at least one virtual object. In other words, the at least one additional portion is merely another portion of the at least one virtual object which may be potentially occluded. Thus, the at least one server indicates the at least one additional portion in the meta information, so that the at least one client device could subsequently check whether the at least one additional portion is definitely occluded or not. Such a change and an additional occlusion due to said change may occur, for example, due to presence of a dynamic real object, a presence of a new real object, or a change in a shape of an existing real object. Examples of the dynamic real object include, but are not limited to, a human, an animal, a robot, a car, and a drone.

In this regard, the at least one server ascertains changes in the optical depths of the real objects, by comparing the optical depths determined from the 3D model and the optical depths in the received depth image. Thus, it can be easily detected whether existing real objects (whose optical depths have been changed) or new real objects (that are now present in the given real-world environment) are responsible for further occluding the at least one virtual object (specifically, the at least one additional portion of the at least one virtual object). Optionally, the at least one server is configured to identify the at least one additional portion that is likely to be occluded, further based on a prediction of a next position of at least one real object. In this regard, the prediction of the next position of the at least one real object may depend on how real objects have been moving in the given real-world environment within a predefined time period from a current time. Such a prediction can be performed, for example, by comparing a sequence of received depth images with a sequence of reconstructed depth images using the 3D model.

Once the at least one additional portion is identified, the optical depths of pixels that represent the at least one additional portion can be ascertained easily and accurately by the at least one server. This is because the at least one virtual object is generated by the at least one server itself, and the given position and at least one of: the size, the shape, the given orientation, of the at least one virtual object, are already known to the at least one server.

The meta information that is sent to the at least one client device enables the at least one client device to utilise the meta information in performing an extra occlusion based on latest depth information of the given real-world environment, as discussed hereinbelow. As an example, the meta information could be provided by adding additional pixels around edges of the at least one (determined) portion of the at least one virtual object that is already occluded. This is done to provide some additional buffer or margin around the at least one (determined) portion of the at least one virtual object that is already occluded. Moreover, as discussed earlier, this is done to ensure that if there is any unexpected movement or change (for example, due to some dynamic real object) in the at least one additional portion (that is potentially occluded), the additional pixels around the edges of the at least one portion may also get occluded, and the at least one client device could have necessary information to render the given MR image correctly. The meta information is optionally stored at the at least one data repository.

Optionally, the system further comprises the at least one client device, wherein the at least one client device is configured to:
  receive, from the at least one server, the remaining portion of the at least one virtual object that is not being occluded and the meta information indicative of: the at least one additional portion of the at least one virtual object that is likely to be occluded and the optical depths of the pixels that represent the at least one additional portion of the at least one virtual object;
  capture a latest depth image from a perspective of a current viewpoint;
  detect whether at least a part of the at least one additional portion of the at least one virtual object indicated in the meta information is occluded by at least one real object, based on a comparison between the optical depths of the pixels that represent the at least one additional portion of the at least one virtual object and optical depths of corresponding pixels in the latest depth image; and
  when it is detected that at least a part of the at least one additional portion of the at least one virtual object is occluded by at least one real object, superimpose a captured image or a virtual representation of the at least one real object on at least said part of the at least one additional portion of the at least one virtual object.

It will be appreciated that the remaining portion of the at least one virtual object and the meta information are received by the at least one client device, in real time or near-real time (without any latency/delay). Moreover, the latest depth image comprises latest optical depths of the real objects from the perspective of the current viewpoint. The latest depth image is captured or is generated in a similar manner as discussed earlier for the received depth image. Further, either a part of or an entirety of the at least one additional portion indicated in the meta information could be occluded by the at least one real object (for example, such as moving dynamic objects). Optionally, the aforesaid comparison between the optical depths of the pixels representing the at least one additional portion and the optical depths of corresponding pixels in the latest depth image is performed in a pixel-by-pixel manner. Optionally, when optical depths of pixels representing at least said part of the at least one additional portion are greater than optical depths of pixels representing the at least one real object in the latest depth image, it is detected the at least one real object is occluding at least the part of the at least one additional portion of the at least one virtual object.

It will be appreciated that when generating the given MR image (as discussed earlier), (the processor of) the at least one client device is configured to superimpose (namely, digitally paint) the captured image or the virtual representation of the at least one real object on top of at least said part of the at least one additional portion. In this way, upon said superimposition, at least said part of the at least one additional portion would not be visible, and would appear to be well-blended with the at least one real object. Beneficially, this improves realism and immersiveness within the MR environment. It will also be appreciated that the captured image could be a VST image. Moreover, the at least one client device could obtain the captured image from the at least one camera. The virtual representation of the at least one real object could be generated using prestored images of the at least one real object (for example, from the at least one data repository). In an example, a virtual representation of a human or its body part may be implemented as an "avatar" of the human.

Furthermore, when the given viewpoint (from the perspective of which the at least one virtual object is generated) and the current viewpoint (from perspective of which the given MR image is to be generated) are different, there would be some offset/skewness in the remaining portion of the at least one virtual object (that is sent to the at least one client device for generating the given MR image) from the perspective of the current viewpoint. In such a case, (the processor of) the at least one client device is configured to reproject the remaining portion of the at least one virtual object from the given viewpoint to the current viewpoint. Optionally, in this regard, the at least one client device is configured to employ at least one image reprojection algorithm. Image reprojection algorithms are well-known in the art.

Optionally, the system further comprises the at least one client device, wherein the at least one client device comprises hand-tracking means, the at least one client device being configured to:
  receive, from the at least one server, the remaining portion of the at least one virtual object that is not being occluded and the meta information indicative of: the at least one additional portion of the at least one virtual object that is likely to be occluded and the optical depths of the pixels that represent the at least one additional portion of the at least one virtual object;
  process hand-tracking data, collected by the hand-tracking means, to determine a relative position of at least one hand of a user with respect to a current viewpoint;
  detect whether at least a part of the at least one additional portion of the at least one virtual object indicated in the meta information is occluded by the at least one hand of the user, based on the optical depths of the pixels that represent the at least one additional portion of the at least one virtual object and the relative position of the at least one hand of the user with respect to the current viewpoint; and
  when it is detected that at least a part of the at least one additional portion of the at least one virtual object is occluded by the at least one hand of the user, superimpose a captured image or a virtual representation of the at least one hand of the user on at least said part of the at least one additional portion of the at least one virtual object.

The term "hand-tracking means" refers to specialized equipment for detecting and/or following a given hand of the user. It will be appreciated that the hand-tracking means could be implemented as at least one of: an optics-based hand-tracking system (which utilizes, for example, infrared beacons and detectors, IR cameras, visible-light cameras, detectable objects and detectors, and the like), an acoustics-based hand-tracking system, a radio-based hand-tracking system, a magnetism-based hand-tracking system, an accelerometer, a gyroscope, an IMU, a TIMU. The hand-tracking means are well-known in the art. The hand tracking data may be in form of images, IMU/TIMU values, motion sensor data values, magnetic field strength values, or similar. Optionally, (the processor of) the at least one client device is configured to process the hand tracking data using at least one data processing algorithm, for determining the relative position of the at least one hand of the user with respect to the current viewpoint. It will be appreciated that said relative position and a position of the current viewpoint could be utilised to determine an optical depth of the at least one hand of the user from the perspective of the current viewpoint, for example, using at least a coordinate geometry-based technique. Examples of the at least one data processing algorithm include a feature detection algorithm, an environment mapping algorithm, a data extrapolation algorithm, and the like.

Further, either a part of or an entirety of the at least one additional portion indicated in the meta information could be occluded by the at least one hand of the user. This particularly happens when the user is wearing the HMD on his/her head, and is moving his/her hand(s) in from of the HMD. Thus, there could be scenario when the at least one hand of the user would lie within the field of view of the user, and would occlude at least a part of the at least one additional portion. Optionally, the at least one client device is configured to compare the optical depths of pixels representing at least said part of the at least one additional portion with the optical depth of the at least one hand of the user. Such a comparison could, for example, be performed in a pixel-by-pixel manner. In this regard, when the optical depths of pixels representing at least said part are greater than the optical depth of the at least one hand of the user, it is detected the at least one hand is occluding at least the part of the at least one additional portion.

It will be appreciated that when generating the given MR image (as discussed earlier), (the processor of) the at least one client device is configured to superimpose (namely, digitally paint) the captured image or the virtual representation of the at least one hand of the user on top of at least said part of the at least one additional portion. In this manner, the at least one virtual object appears to be well-blended with the real objects (including the at least one hand of the user) in the generated MR image. Beneficially, this facilitates in providing a highly realistic and immersive viewing experience to the user when the generated MR image is displayed to the user. It will also be appreciated that the captured image of the at least one hand of the user could be a VST image. Moreover, the at least one client device could obtain said captured image from the at least one camera. The virtual representation of the at least one hand could be generated using prestored images of the at least one hand (for example, at the at least one data repository). In an example, a virtual representation of the at least one hand of the user may be in a form a robotic hand.

The present disclosure also relates to the method as described above. Various embodiments and variants disclosed above, with respect to the aforementioned system, apply mutatis mutandis to the method.

Optionally, the method further comprises:
receiving, at the at least one server from the at least one client device, a depth image captured from a perspective of the given viewpoint;
identifying, at the at least one server, at least one additional portion of the at least one virtual object that is likely to be occluded, based on a comparison between the optical depths determined from the 3D model and optical depths in the received depth image;
determining, at the at least one server, optical depths of pixels that represent the at least one additional portion of the at least one virtual object, based on the given position at which the at least one virtual object is to be embedded with respect to the given viewpoint, and at least one of: the size of the at least one virtual object, the shape of the at least one virtual object, the given orientation of the at least one virtual object with respect to the given viewpoint; and
sending, from the at least one server to the at least one client device, meta information indicative of: the at least one additional portion of the at least one virtual object that is likely to be occluded and the optical depths of the pixels that represent the at least one additional portion of the at least one virtual object.

Optionally, the method further comprises:
receiving, at the at least one client device from the at least one server, the remaining portion of the at least one virtual object that is not being occluded and the meta information indicative of: the at least one additional portion of the at least one virtual object that is likely to be occluded and the optical depths of the pixels that represent the at least one additional portion of the at least one virtual object;
capturing, at the at least one client device, a latest depth image from a perspective of a current viewpoint;
detecting, at the at least one client device, whether at least a part of the at least one additional portion of the at least one virtual object indicated in the meta information is occluded by at least one real object, based on a comparison between the optical depths of the pixels that represent the at least one additional portion of the at least one virtual object and optical depths of corresponding pixels in the latest depth image; and
when it is detected that at least a part of the at least one additional portion of the at least one virtual object is occluded by at least one real object, superimposing, at the at least one client device, a captured image or a virtual representation of the at least one real object on at least said part of the at least one additional portion of the at least one virtual object.

Optionally, the at least one client device comprises hand-tracking means, wherein the method further comprises:
receiving, at the at least one client device from the at least one server, the remaining portion of the at least one virtual object that is not being occluded and the meta information indicative of: the at least one additional portion of the at least one virtual object that is likely to be occluded and the optical depths of the pixels that represent the at least one additional portion of the at least one virtual object;
processing, at the at least one client device, hand-tracking data collected by the hand-tracking means, for determining a relative position of at least one hand of a user with respect to a current viewpoint;
detecting, at the at least one client device, whether at least a part of the at least one additional portion of the at least one virtual object indicated in the meta information is occluded by the at least one hand of the user, based on the optical depths of the pixels that represent the at least one additional portion of the at least one virtual object and the relative position of the at least one hand of the user with respect to the current viewpoint; and when it is detected that at least a part of the at least one additional portion of the at least one virtual object is occluded by the at least one hand of the user, superimposing, at the at least one client device, a captured image or a virtual representation of the at least one hand of the user on at least said part of the at least one additional portion of the at least one virtual object.

Optionally, the method further comprises generating, at the at least one server, the at least one virtual object that is to be embedded, based on at least one of: an empty space that is not occupied by any real object in the given real-world environment, information to be presented to a user via the at least one virtual object.

Optionally, the method further comprises determining, at the at least one server, the given position at which the at least one virtual object is to be embedded with respect to the given viewpoint, based on at least one of: an empty space that is not occupied by any real object in the given real-world environment, a gaze region in the given real-world environment.

Optionally, the method further comprises determining, at the at least one server, the given orientation of the at least one virtual object with respect to the given viewpoint, based on at least one of: a distance of the given viewpoint from at least one plane of the given real-world environment, relative positions of real objects present in the given real-world environment with respect to each other.

DETAILED DESCRIPTION OF THE DRAWINGS

Figure 1B:
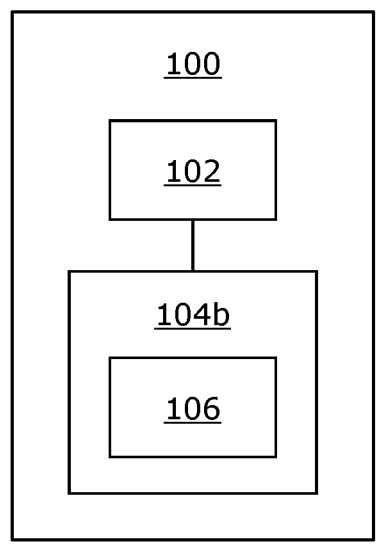

Referring to FIGS. 1A and 1B, illustrated are block diagrams of architectures of a system 100 incorporating mixed-reality (MR) occlusion using three-dimensional (3D) reconstruction, in accordance with different embodiments of the present disclosure. In FIGS. 1A and 1B, the system 100 comprises at least one server (depicted as a server 102) that is communicably coupled to at least one client device (depicted as client devices 104a, 104b and 104c). In FIG. 1B, the system 100 further comprises the client device 104b. Optionally, the client device 104b comprises hand-tracking means 106.

It may be understood by a person skilled in the art that the FIGS. 1A and 1B include simplified architectures of the system 100 for sake of clarity, which should not unduly limit the scope of the claims herein. It is to be understood that specific implementations of the system 100 are provided as examples and are not to be construed as limiting it to specific numbers or specific types of servers, client devices, and hand-tracking means. The person skilled in the art will recognize many variations, alternatives, and modifications of embodiments of the present disclosure.

Figure 2:
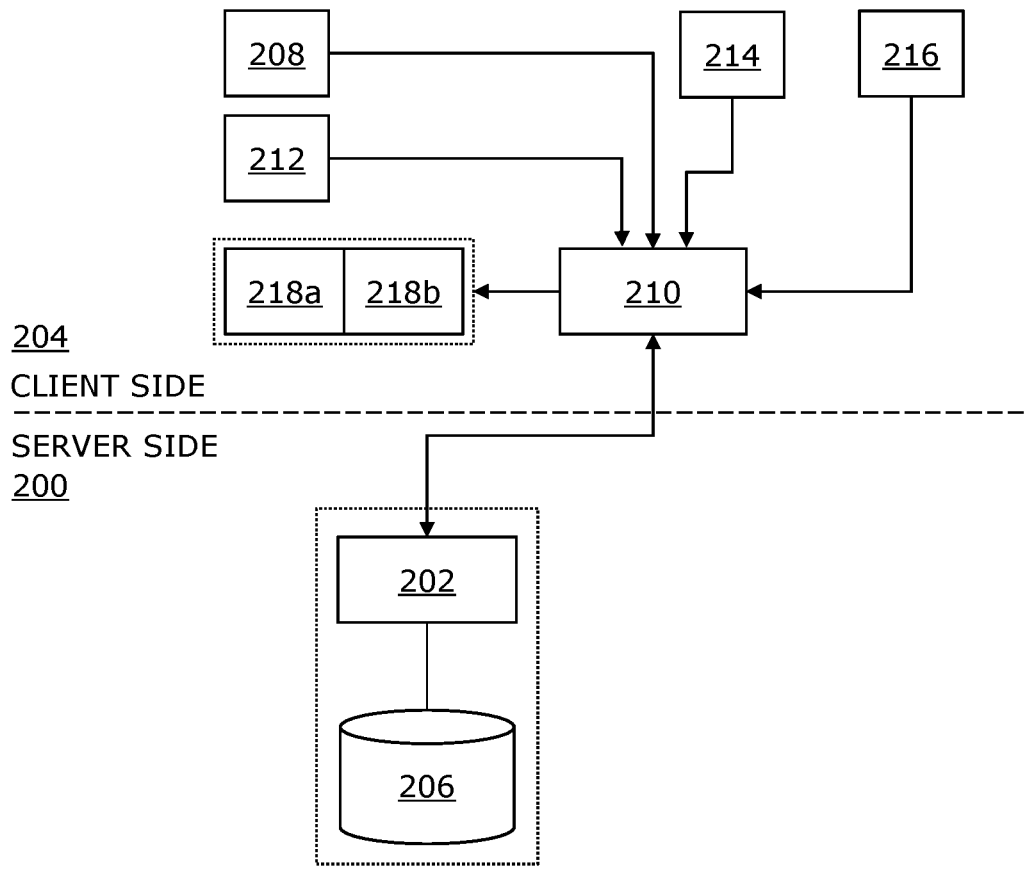
FIG. 2 illustrates an environment in which a system incorporating MR occlusion using 3D reconstruction is used, in accordance with an embodiment of the present disclosure.

Referring to FIG. 2, illustrated is an environment in which a system 200 incorporating MR occlusion using 3D reconstruction is used, in accordance with an embodiment of the present disclosure. The system 200 comprises at least one server (depicted as a server 202) that is communicably coupled to at least one client device (depicted as a client 204). The system 200 further comprises at least one data repository (depicted as a data repository 206) communicably coupled to the server 202. Optionally, the data repository 206 stores a 3D model of a given real-world environment.

The server 202 is configured to obtain the 3D model, and receive, from the at least one client device 204, viewpoint information indicative of a given viewpoint from a perspective of which a given MR image is to be generated. The viewpoint information is generated using tracking means 208 of the at least one client device 204, and is received from (a processor 210 of) the at least one client device 204. Optionally, the server 202 is configured to receive, from the at least one client device 204, a depth image captured from a perspective of the given viewpoint. The depth image is optionally captured by a depth camera 212 of the at least one client device 204. Moreover, the server 202 is optionally configured to receive information indicative of gaze directions of the given user's eyes, wherein said information is generated using a gaze-tracking means 214 of the at least one client device 204. The server 202 is configured to utilise the 3D model, the viewpoint information, and optionally, the depth image and the gaze directions, to determine at least one portion of the at least one virtual object that is being occluded by at least one real object present in the given real-world environment, and optionally at least one additional portion of the at least one virtual object that is likely to be occluded. The server 202 is configured to then send, to the processor 210 of the at least one client device 204, a remaining portion of the at least one virtual object that is not being occluded, and optionally meta information indicative of the at least one additional portion of the at least one virtual object that is likely to be occluded.

Upon receiving the remaining portion, the processor 210 is configured to digitally embed/superimpose the remaining portion in a given input image, to generate the given MR image. The given input image may be a video-see-through image captured by at least one camera 216 of the at least one client device 204. The processor 210 is optionally configured to perform further occlusion of the at least one virtual object by occluding at least a part of the at least one additional portion of the at least one virtual object that is occluded by at least one real object. The processor 210 is configured to display the given MR image via at least one light source (for example, depicted as light sources 218a and 218b).

Figure 3:
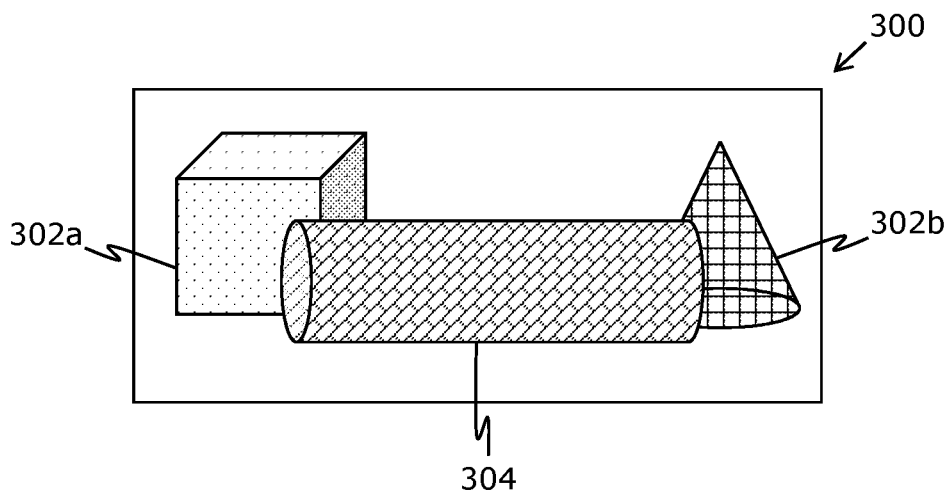
FIG. 3 illustrates an exemplary MR image representing occlusion of at least one virtual object by at least one real object present in a given real-world environment, in accordance with an embodiment of the present disclosure.

Referring to FIG. 3, illustrated is an exemplary mixed-reality (MR) image 300 representing occlusion of at least one virtual object (depicted as virtual objects 302a and 302b) by at least one real object (depicted as a real object 304) present in a given real-world environment, in accordance with an embodiment of the present disclosure. In the MR image, the virtual objects 302a-b are shown to be partially occluded, meaning that some portions of the virtual objects 302a-b are occluded by the real object 304, but some remaining portions of the virtual objects 302a-b are not occluded by the real object 304. For sake of simplicity and better understanding, the virtual objects 302a-b are represented as a cube and a cone, respectively, whereas the real object 304 is represented as a cylinder.

Figure 4A:
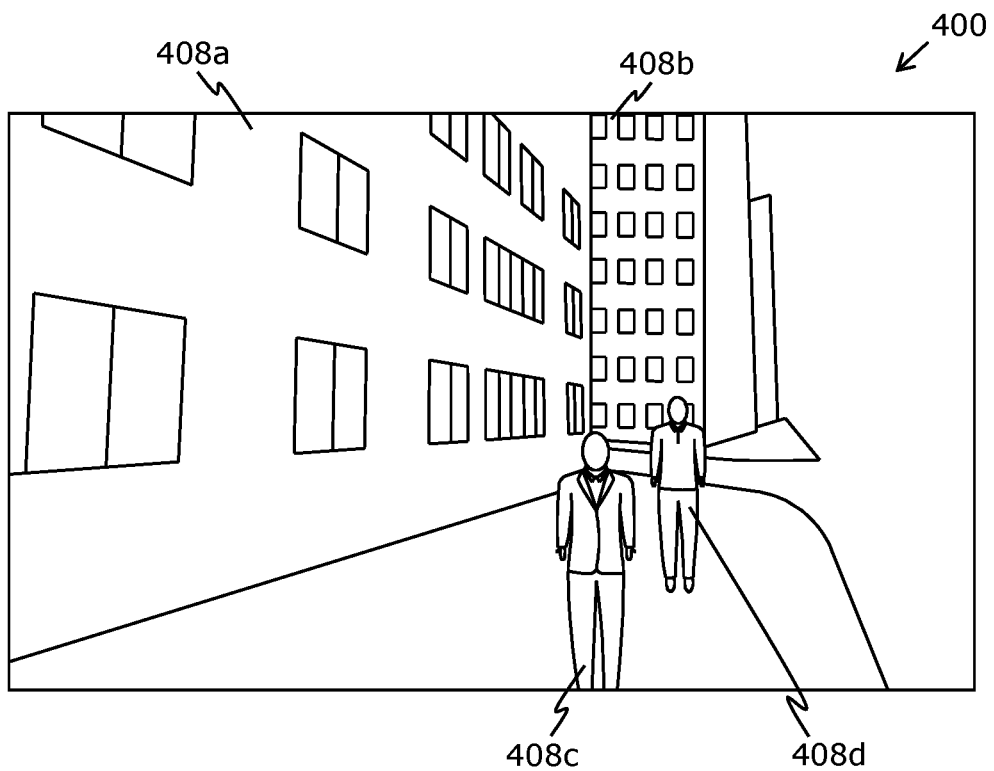
FIG. 4A illustrates an exemplary input image.
Figure 4B:
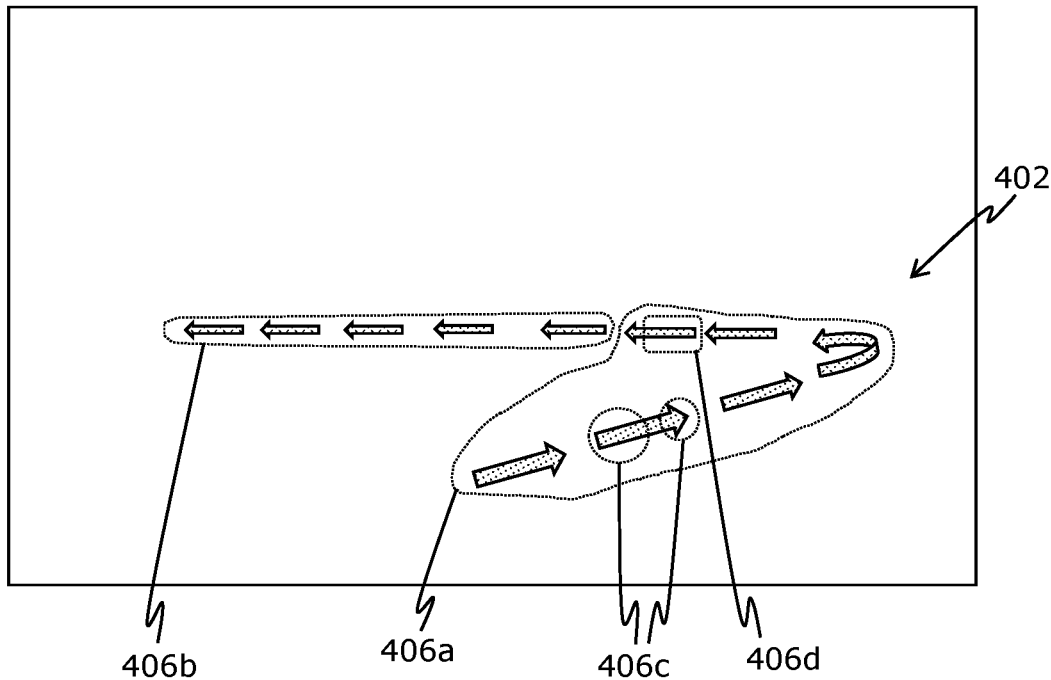
FIG. 4B illustrates at least one virtual object that is to be embedded in a given MR image.
Figure 4C:
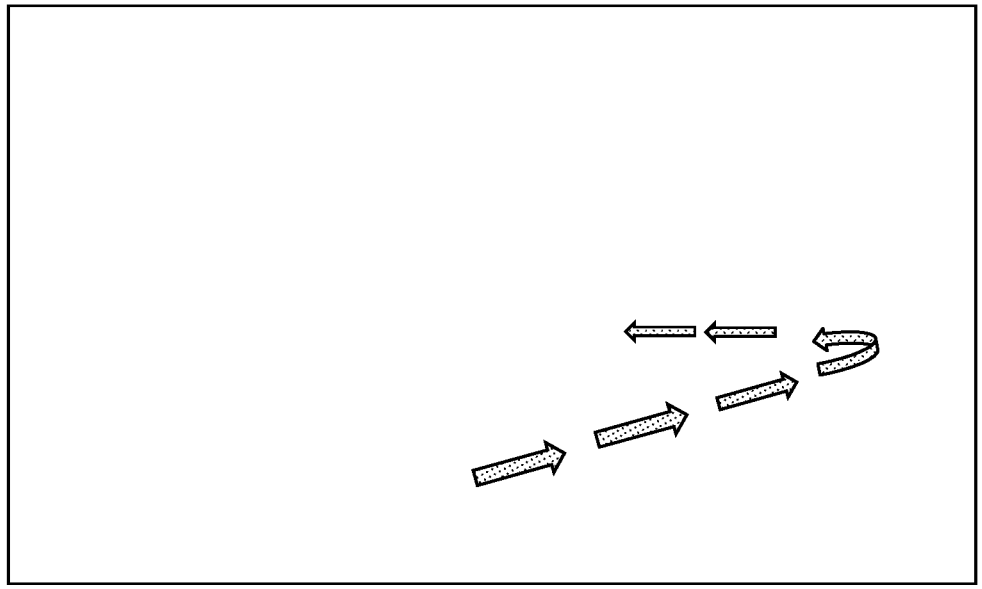
Figure 4D:
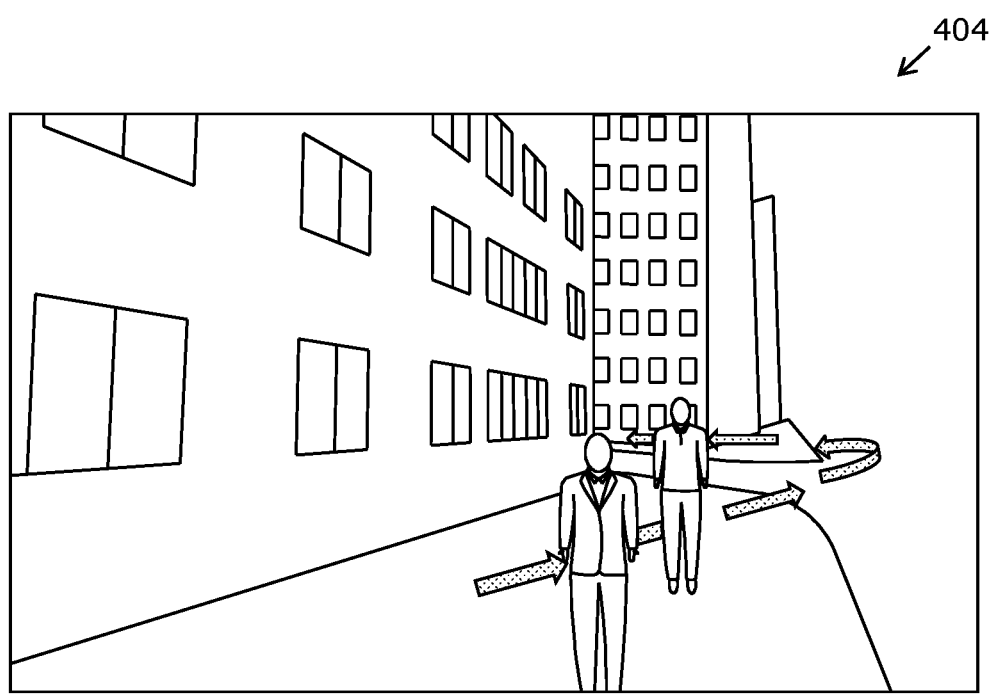
FIG. 4D illustrates the given MR image, in accordance with an embodiment of the present disclosure.

Referring to FIGS. 4A-4D, FIG. 4A illustrates an exemplary input image 400, FIG. 4B illustrates at least one virtual object (depicted as a virtual object 402) that is to be embedded in a given mixed-reality (MR) image 404 (as shown in FIG. 4D), FIG. 4C illustrates a remaining portion 406a of the virtual object 402 that is not being occluded, while FIG. 4D illustrates the given MR image 404, in accordance with an embodiment of the present disclosure.

In FIG. 4A, the input image 400 represents a scene of a given real-world environment. The scene of the given real-world environment comprises real objects 408a, 408b, 408c, and 408d therein. For example, the real objects 408a-b are buildings, whereas the real objects 408c-d are people.

In FIG. 4B, the virtual object 402 is, for example, a virtual navigation assistant. The virtual object 402 is shown to include virtual navigation marks (depicted as arrows). For example, a person viewing the given MR image 404 is expected to follow the virtual navigation marks for navigating within an MR environment represented by the given MR image 404. The virtual object 402 has a portion 406b which is occluded by the real object 408a, and the remaining portion 406a which is not occluded by any real object from amongst the real objects 408a-d. Moreover, there may be identified at least one additional portion (depicted as additional portions 406c and 406d) of the virtual object 402 that is likely to be occluded by (some parts of) the real objects 408c and 408d. When it is detected that at least a part of the additional portions 406c and 406d of the virtual object 402 is occluded by the real objects 408c and 408d, a captured image or a virtual representation of the real objects 408c and 408d is superimposed on at least said part of the additional portions 406c and 406d of the virtual object 402, respectively, for generating the given MR image 404.

In FIG. 4C, the remaining portion 406a of the virtual object 402 is shown to include only some of the virtual navigation marks (depicted as arrows) from amongst an entirety of the virtual navigation marks. The remaining portion 406a of the virtual object 402 is sent, from at least one server, to at least one client device at which the given MR image 404 is to be generated. In FIG. 4D, the given MR image 404 represents the remaining portion 406a of the virtual object 402 therein, while the portion 406b of the virtual object 402 appears occluded therein.

FIGS. 2, 3 and 4A-4D are merely examples, which should not unduly limit the scope of the claims herein. A person skilled in the art will recognize many variations, alternatives, and modifications of embodiments of the present disclosure.

Figure 5:
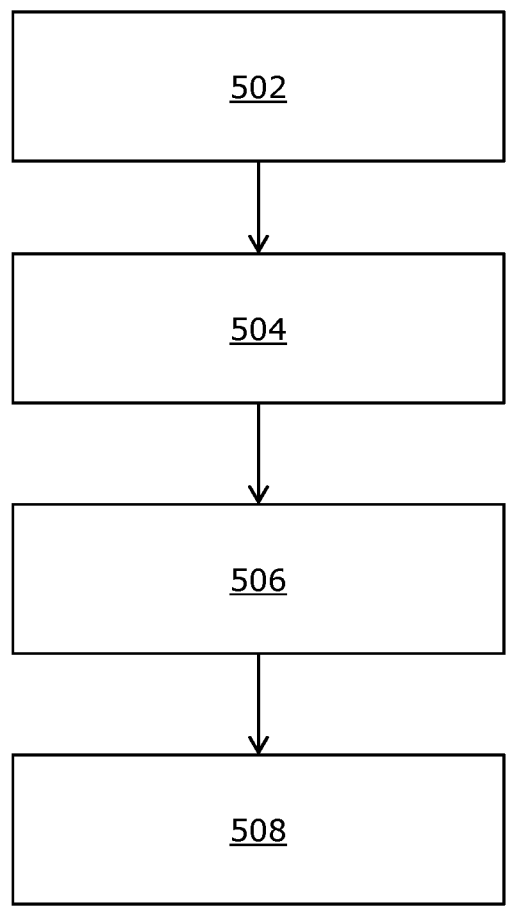
FIG. 5 illustrates steps of a method incorporating MR occlusion using 3D reconstruction, in accordance with an embodiment of the present disclosure.

Referring to FIG. 5, illustrated are steps of a method incorporating mixed-reality (MR) occlusion using three-dimensional (3D) reconstruction, in accordance with an embodiment of the present disclosure. At step 502, a 3D model of a given real-world environment is obtained. At step 504, there is received, from at least one client device, viewpoint information indicative of a given viewpoint from a perspective of which a given mixed-reality (MR) image is to be generated. At step 506, for at least one virtual object that is to be embedded in the given MR image, there is determined at least one portion of the at least one virtual object that is being occluded by at least one real object present in the given real-world environment, based on optical depths determined from the 3D model corresponding to the given viewpoint, a given position at which the at least one virtual object is to be embedded with respect to the given viewpoint, and at least one of: a size of the at least one virtual object, a shape of the at least one virtual object, a given orientation of the at least one virtual object with respect to the given viewpoint. At step 508, a remaining portion of the at least one virtual object that is not being occluded is sent to the at least one client device.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising at least one server that is communicably coupled to at least one client device, wherein the at least one server is configured to:
   obtain a three-dimensional (3D) model of a given real-world environment;
   receive, from the at least one client device, viewpoint information indicative of a given viewpoint from a perspective of which a given mixed-reality (MR) image is to be generated;
   for at least one virtual object that is to be embedded in the given MR image, determine at least one portion of the at least one virtual object that is being occluded by at least one real object present in the given real-world environment, based on optical depths determined from the 3D model corresponding to the given viewpoint, a given position at which the at least one virtual object is to be embedded with respect to the given viewpoint, and at least one of: a size of the at least one virtual object, a shape of the at least one virtual object, a given orientation of the at least one virtual object with respect to the given viewpoint; and
   send a remaining portion of the at least one virtual object that is not being occluded to the at least one client device,
wherein the at least one server is configured to:
   receive, from the at least one client device, a depth image captured from a perspective of the given viewpoint;
   identify at least one additional portion of the at least one virtual object that is likely to be occluded, based on a comparison between the optical depths determined from the 3D model and optical depths in the received depth image;
   determine optical depths of pixels that represent the at least one additional portion of the at least one virtual object, based on the given position at which the at least one virtual object is to be embedded with respect to the given viewpoint, and at least one of: the size of the at least one virtual object, the shape of the at least one virtual object, the given orientation of the at least one virtual object with respect to the given viewpoint; and
   send, to the at least one client device, meta information indicative of: the at least one additional portion of the at least one virtual object that is likely to be occluded and the optical depths of the pixels that represent the at least one additional portion of the at least one virtual object.

2. The system of claim 1, further comprising the at least one client device, wherein the at least one client device is configured to:
   receive, from the at least one server, the remaining portion of the at least one virtual object that is not being occluded and the meta information indicative of: the at least one additional portion of the at least one virtual object that is likely to be occluded and the optical depths of the pixels that represent the at least one additional portion of the at least one virtual object;
   capture a latest depth image from a perspective of a current viewpoint;
   detect whether at least a part of the at least one additional portion of the at least one virtual object indicated in the meta information is occluded by at least one real object, based on a comparison between the optical depths of the pixels that represent the at least one additional portion of the at least one virtual object and optical depths of corresponding pixels in the latest depth image; and
   when it is detected that at least a part of the at least one additional portion of the at least one virtual object is occluded by at least one real object, superimpose a captured image or a virtual representation of the at least one real object on at least said part of the at least one additional portion of the at least one virtual object.

3. The system of claim 1, further comprising the at least one client device, wherein the at least one client device comprises hand-tracking means, the at least one client device being configured to:

receive, from the at least one server, the remaining portion of the at least one virtual object that is not being occluded and the meta information indicative of: the at least one additional portion of the at least one virtual object that is likely to be occluded and the optical depths of the pixels that represent the at least one additional portion of the at least one virtual object;

process hand-tracking data, collected by the hand-tracking means, to determine a relative position of at least one hand of a user with respect to a current viewpoint;

detect whether at least a part of the at least one additional portion of the at least one virtual object indicated in the meta information is occluded by the at least one hand of the user, based on the optical depths of the pixels that represent the at least one additional portion of the at least one virtual object and the relative position of the at least one hand of the user with respect to the current viewpoint; and when it is detected that at least a part of the at least one additional portion of the at least one virtual object is occluded by the at least one hand of the user, superimpose a captured image or a virtual representation of the at least one hand of the user on at least said part of the at least one additional portion of the at least one virtual object.

4. The system of claim 1, wherein the at least one server is configured to generate the at least one virtual object that is to be embedded, based on at least one of: an empty space that is not occupied by any real object in the given real-world environment, information to be presented to a user via the at least one virtual object.

5. The system of claim 1, wherein the at least one server is configured to determine the given position at which the at least one virtual object is to be embedded with respect to the given viewpoint, based on at least one of: an empty space that is not occupied by any real object in the given real-world environment, a gaze region in the given real-world environment.

6. The system of claim 1, wherein the at least one server is configured to determine the given orientation of the at least one virtual object with respect to the given viewpoint, based on at least one of: a distance of the given viewpoint from at least one plane of the given real-world environment, relative positions of real objects present in the given real-world environment with respect to each other.

7. A method comprising:
obtaining, by at least one server, a three-dimensional (3D) model of a given real-world environment;
receiving, at the at least one server from at least one client device, viewpoint information indicative of a given viewpoint from a perspective of which a given mixed-reality (MR) image is to be generated;
for at least one virtual object that is to be embedded in the given MR image, determining, at the at least one server, at least one portion of the at least one virtual object that is being occluded by at least one real object present in the given real-world environment, based on optical depths determined from the 3D model corresponding to the given viewpoint, a given position at which the at least one virtual object is to be embedded with respect to the given viewpoint, and at least one of: a size of the at least one virtual object, a shape of the at least one virtual object, a given orientation of the at least one virtual object with respect to the given viewpoint;
sending a remaining portion of the at least one virtual object that is not being occluded, from the at least one server to the at least one client device;

receiving, at the at least one server from the at least one client device, a depth image captured from a perspective of the given viewpoint;
identifying, at the at least one server, at least one additional portion of the at least one virtual object that is likely to be occluded, based on a comparison between the optical depths determined from the 3D model and optical depths in the received depth image;
determining, at the at least one server, optical depths of pixels that represent the at least one additional portion of the at least one virtual object, based on the given position at which the at least one virtual object is to be embedded with respect to the given viewpoint, and at least one of: the size of the at least one virtual object, the shape of the at least one virtual object, the given orientation of the at least one virtual object with respect to the given viewpoint; and
sending, from the at least one server to the at least one client device, meta information indicative of: the at least one additional portion of the at least one virtual object that is likely to be occluded and the optical depths of the pixels that represent the at least one additional portion of the at least one virtual object.

8. The method of claim 7, further comprising:
receiving, at the at least one client device from the at least one server, the remaining portion of the at least one virtual object that is not being occluded and the meta information indicative of: the at least one additional portion of the at least one virtual object that is likely to be occluded and the optical depths of the pixels that represent the at least one additional portion of the at least one virtual object;
capturing, at the at least one client device, a latest depth image from a perspective of a current viewpoint;
detecting, at the at least one client device, whether at least a part of the at least one additional portion of the at least one virtual object indicated in the meta information is occluded by at least one real object, based on a comparison between the optical depths of the pixels that represent the at least one additional portion of the at least one virtual object and optical depths of corresponding pixels in the latest depth image; and
when it is detected that at least a part of the at least one additional portion of the at least one virtual object is occluded by at least one real object, superimposing, at the at least one client device, a captured image or a virtual representation of the at least one real object on at least said part of the at least one additional portion of the at least one virtual object.

9. The method of claim 7, wherein the at least one client device comprises hand-tracking means, and wherein the method further comprises:
receiving, at the at least one client device from the at least one server, the remaining portion of the at least one virtual object that is not being occluded and the meta information indicative of: the at least one additional portion of the at least one virtual object that is likely to be occluded and the optical depths of the pixels that represent the at least one additional portion of the at least one virtual object;
processing, at the at least one client device, hand-tracking data collected by the hand-tracking means for determining a relative position of at least one hand of a user with respect to a current viewpoint;
detecting, at the at least one client device, whether at least a part of the at least one additional portion of the at least one virtual object indicated in the meta information is occluded by the at least one hand of the user, based on the optical depths of the pixels that represent the at least one additional portion of the at least one virtual object and the relative position of the at least one hand of the user with respect to the current viewpoint; and when it is detected that at least a part of the at least one additional portion of the at least one virtual object is occluded by the at least one hand of the user, superimposing, at the at least one client device, a captured image or a virtual representation of the at least one hand of the user on at least said part of the at least one additional portion of the at least one virtual object.

10. The method of claim 7, further comprising generating, at the at least one server, the at least one virtual object that is to be embedded, based on at least one of: an empty space that is not occupied by any real object in the given real-world environment, information to be presented to a user via the at least one virtual object.

11. The method of claim 7, further comprising determining, at the at least one server, the given position at which the at least one virtual object is to be embedded with respect to the given viewpoint, based on at least one of: an empty space that is not occupied by any real object in the given real-world environment, a gaze region in the given real-world environment.

12. The method of claim 7, further comprising determining, at the at least one server, the given orientation of the at least one virtual object with respect to the given viewpoint, based on at least one of: a distance of the given viewpoint from at least one plane of the given real-world environment, relative positions of real objects present in the given real-world environment with respect to each other.

* * * * *